United States Patent [19]

Van der Laar

[11] Patent Number: 5,544,214
[45] Date of Patent: Aug. 6, 1996

[54] VIDEO SYSTEM WITH AUTOMATIC GAIN CONTROL

[75] Inventor: Josephus C. Van der Laar, Eindhoven, Netherlands

[73] Assignee: U.S. Philips Corporation, New York, N.Y.

[21] Appl. No.: 190,432

[22] Filed: Feb. 2, 1994

[30] Foreign Application Priority Data

Feb. 2, 1993 [EP] European Pat. Off. .............. 93200258

[51] Int. Cl.[6] .................................................. H04N 1/00
[52] U.S. Cl. ......................................... 378/98.7; 378/98.2
[58] Field of Search ................................ 378/98.7, 98.2; 348/678, 687

[56] References Cited

U.S. PATENT DOCUMENTS 4,910,592  3/1990  Shroy, Jr. et al. ................ 378/98.7
5,003,572  3/1991  Meccariello et al. .............. 378/98.7

FOREIGN PATENT DOCUMENTS 3925329  2/1991  Germany.

Primary Examiner—David P. Porta
Attorney, Agent, or Firm—Jack D. Slobod

[57] ABSTRACT

A video system, for example an X-ray examination apparatus, includes a variable gain video amplifier (20) whose gain is varied by a control circuit (40), which produces a control signal at a control input (23) of the amplifier. The value of the control signal is derived to the control circuit from the ratio of a reference value (Vref) to the amplitude of the amplified video signal (Vu). This amplitude is measured in a detector (30) which supplies an amplitude signal (Vd) as input for the control circuit. By combining this ratio with the already adjusted gain (K), stored in a memory (47), practically instant adaptation of the gain is possible when the amplitude (Vi) of the input signal changes.

8 Claims, 2 Drawing Sheets

VIDEO SYSTEM WITH AUTOMATIC GAIN CONTROL

BACKGROUND OF THE INVENTION

1. Field of the Invention

The invention relates to a video system with automatic gain control, including a variable gain video amplifier responsive, via a control circuit, to the output of a detector coupled to the signal output of the video amplifier. A video system of this kind, having automatic gain control via feedback, is used to obtain a video image of constant brightness, for example the mean or peak brightness in the event of a varying intensity of the video signal applied to the input of the amplifier, for example due to variation of illumination of or absorption in an object observed by means of the video system.

2. Description of the Related Art

A video system of this kind is known from DE-A 39 25 329. Therein, a circuit for a video system is described in which the output signal of a video camera is amplified by means of a controllable amplifier. The amplified signal charges a first capacitor via a system of switches and a rectifier. The charge across the first capacitor is transferred, via a further switch, to a second capacitor which is connected to a first input of a differential amplifier. It is thus achieved that the voltage across the second capacitor represents the current value of the brightness obtained for the brightness control. The second input of the differential amplifier receives a reference voltage. The output signal of the differential amplifier is used to control the gain of the video amplifier.

In the known video system, the gain of the video amplifier is varied by an amount which is proportional to the difference between the actual brightness and the reference value. When the mean brightness of the video signal presented to the video amplifier changes, to begin with the gain is then changed by a value which is proportional to the change of the amplitude of the video signal. It is only subsequently that via the feedback the gain is readjusted until the desired level of the output signal is obtained again. Consequently, the adjusted brightness is reached only in the course of time and, in the event of large level variations of the video signal, a damped oscillating level of the output signal may occur.

SUMMARY OF THE INVENTION

It is inter alia an object of the invention to provide a video system in which the period of time required to reach the adjusted brightness level of the output signal is reduced as much as possible and in which oscillations of the level of the output signal are avoided also in the event of large variations of the level of the input signal.

To achieve this, the video system in accordance with the invention is characterized in that the control circuit is operative to supply a control signal which is derived from the ratio of a reference value to the level of the output signal of the detector. As a result, the gain of the video amplifier is changed directly to a value whereby the adjusted desired brightness is obtained. This is in contrast with the known method where the magnitude of the deviation between the actual and the desired brightness is used to readjust the video amplifier. Because the control in accordance with the invention in principle requires only one image with a new input level to determine the required gain, this is the fastest possible method of adapting the gain to a new input level via feedback.

In an embodiment of a video system in accordance with the invention the desired result is achieved in that the control circuit comprises a memory circuit for storing a previous value of the gain of the video amplifier and is operative to supply, at a later instant, a control signal which is proportional to the previous value stored in the memory circuit. The new value for the gain ($K_{n+1}$) can then be simply calculated by multiplying the stored value of the gain ($K_n$) by the ratio of the reference value to the detected level of the output signal.

This embodiment is preferably characterized in that the memory circuit is a sample-and-hold circuit, an input of which is coupled to the output of the control circuit. The value of the control signal associated with a video image is thus retained until the level of the subsequent video image is available to calculate a new value of the control signal. After calculation, the stored contents are replaced by the new value determined.

An embodiment of the video system in accordance with the invention is characterized in that the control circuit is operative to supply a control signal for changing the gain of the video amplifier by a value which is a part of the ratio of the reference value to the level of the output signal of the detector. The speed of the control is thus reduced, offering the advantage that variations of the input level are not immediately corrected but remain visible for some time as increased or decreased brightness of the image formed by means of the output signal. In order to prevent the changed brightness from becoming permanent, the control signal should contain not only a component amounting to a fraction $\alpha$ of said ratio but also a component $(1-\alpha)$. The fraction $\alpha$ is a measure of the response time of the control circuit.

The invention is of particular importance when the video system is a (medical) X-ray examination apparatus. In order to minimize the X-ray dose whereto a patient is exposed during an examination, fast adaptation of the brightness of the image to be formed, and hence of the level of the output signal of the video amplifier, is necessary. Notably in the case of low scanning speeds, for example 25 or 12.5 Hz, enabling sequential scanning of an image to be picked up and hence a higher resolution, the period of adaptation of a conventional video system to changing illumination conditions may be as long as one second or more. Useful observation is not possible during this period. This represents a load to the patient and an annoyance to the observer. In a medical X-ray examination apparatus, changing of the amplitude of the video signal occurs due to a change of the intensity of the X-ray source, a movement of the patient, or a change of the sensitivity of the X-ray detector.

BRIEF DESCRIPTION OF THE DRAWING

These and other aspects of the invention will be described in detail hereinafter, by way of example, with reference to the drawing.

Therein.

DETAILED DESCRIPTION OF THE
PREFERRED EMBODIMENTS

Figure 1:
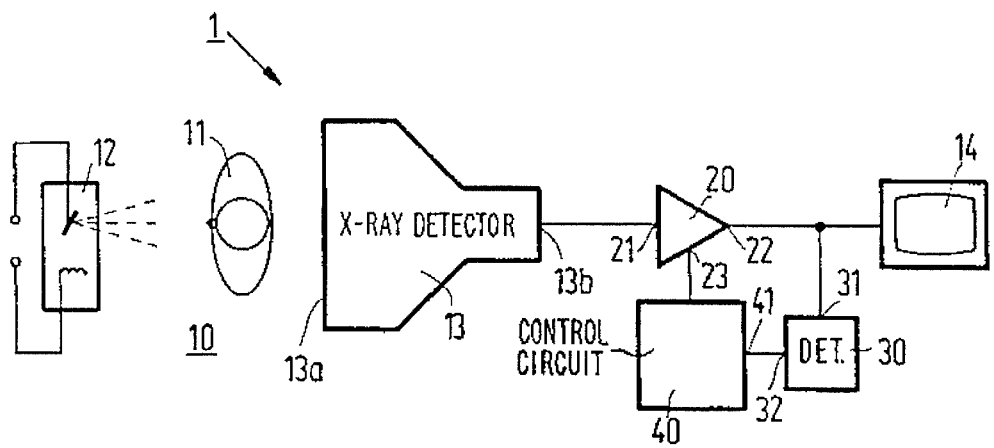
FIG. 1 shows diagrammatically a video system in accordance with the invention which is constructed as an X-ray examination apparatus.

Similar elements are denoted by corresponding references in the various Figures. FIG. 1 shows a video system in accordance with the invention in the form of an X-ray examination apparatus 1. It comprises an examination space 10 in which an object 11 to be examined is to be arranged, for example a patient. The X-ray examination apparatus also comprises an X-ray source 12, an X-ray detector 13 and a video processing section for forming an image on, for example a monitor 14 and/or for storing an image on a storage medium. When the X-ray source is switched on, a shadow image of the object 11 is formed on the pick-up screen 13a of the X-ray detector 13. The shadow image is scanned and converted into a video signal which becomes available via the output 13b of the X-ray detector. The video signal is subsequently applied to a video amplifier 20, after which it is displayed as a visible image on the monitor 15 or is processed in a different manner. The X-ray detector 13 is formed, for example, by a system consisting of a successively arranged image intensifier and a video camera comprising a pick-up tube or solid-state (CCD) pick-up device. The X-ray detector 13 may also be a pick-up device comprising a matrix of X-ray-sensitive elements whereby the shadow image is converted directly into a video signal.

The gain of the video amplifier 20 can be controlled by means of a control signal on a control input 23. The value of the control signal is determined in a control circuit 40 and must be adapted to the desired level of the amplified signal. To this end there is provided a detector 30 whose input 31 is connected to the output 22 of the video amplifier. The detector 30 supplies an output signal which is a measure of the intensity of the amplified video signal. This is, for example the maximum or the mean signal strength within an image or a number of images. To this end, the detector 30 comprises a peak detector or an integrator which processes the video signal presented in an interval corresponding to one or more video images and which generates an output signal which is proportional to the detected maximum of the amplitude of the video signal or the time-integrated value thereof.

The output 32 of the detector 30 is connected to the input 41 of the control circuit 40. On the basis of the output signal (Vd) of the detector 30 and using a set reference value (Vref), the desired gain (K) is determined in the control circuit 40 and a control signal is generated whereby the video amplifier is adjusted to this new gain. In order to achieve fast adaptation of the gain, the new gain is derived from the gain prevailing at that instant and the ratio Vref/Vd:$K_{n+1}= K_n \cdot (Vref/Vd_n)$, where $K_{n+1}$ is the new gain value and $K_n$ and $Vd_n$ are the gain and the output signal of the detector upon the $n^{th}$ interval in which the gain is determined. Each interval may coincide with the time during which a shadow image is completely scanned; however, an interval may also cover several, consecutively picked up images. The control circuit 40 may be an analog circuit or a digital circuit, for example a microprocessor; in the latter case, the detector 30 or the input of the control circuit should be provided with an analog-to-digital converter. The video amplifier 20 and the control circuit 40 are preferably constructed so that the control signal indicates the video amplifier gain to be adjusted and not the change of an existing setting.

If desired, the automatic gain control in a video system can be deactivated, for example by connecting the control input 23, via a switch, to a source which generates a signal which is constant or adjustable in a different manner.

Figure 2:
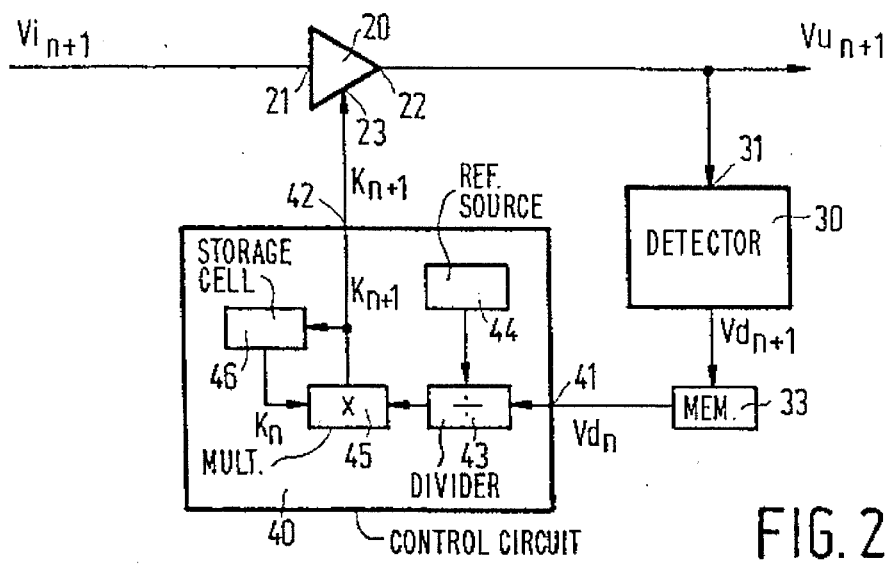
FIG. 2 shows diagrammatically a part of the video system in accordance with the invention.

FIG. 2 is a more detailed representation of a part of a video system in accordance with the invention. The Figure shows only the video amplifier 20, the detector 30 and the control circuit 40. The video signal $Vi_{n+1}$, originating from the X-ray detector 13, is amplified so as to form an output signal $Vu_{n+1}$ in the video amplifier 20. The value of the amplitude $Vd_{n+1}$ of the signal $Vu_{n+1}$ is measured in the detector 30 and temporarily stored in a memory 33. The value $Vd_n$ of the amplitude of the output signal $Vu_n$, determined during the preceding interval, is read from the memory 33 and the ratio of the reference value Vref to $Vd_n$ is calculated in the divider 43. Vref originates, from a reference source 44 for example from a (rewritable) storage element or the setting of a potentiometer. The result of the division is subsequently multiplied, in a multiplier 45, by the value $K_n$ which represents the actual gain in the video amplifier 20 and which is stored in a memory cell 46. The multiplication result, $K_{n+1}$, constitutes the control signal and is applied, via the output 42 of the control circuit 40, to the video amplifier 20 in order to change the gain thereof to the value $K_{n+1}$. This result $K_{n+1}$ is also stored in the storage cell 46. For example, a sample-and-hold circuit whose input is (internally) coupled to the output 42 of the control circuit can be used as a suitable storage cell.

Figure 3:
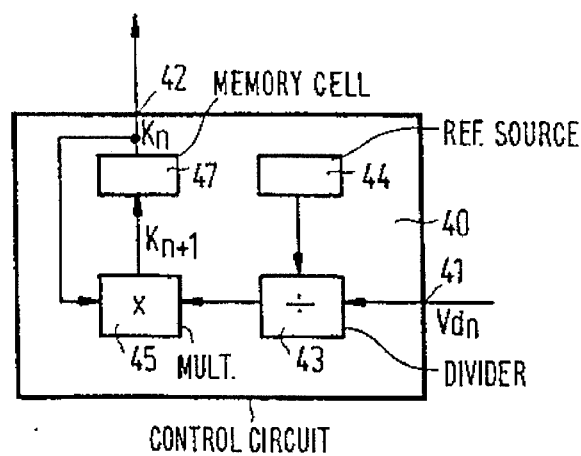
FIG. 3 shows diagrammatically an alternative embodiment of the invention.

FIG. 3 shows an alternative embodiment of the control circuit 40. In this embodiment the result of the multiplication in the multiplier 45 is stored in a memory cell 47. The control signal is derived from the value stored in the memory cell 47 and this value is also applied to the multiplier 45. Evidently, further alternatives where, for example the succession of multiplication and division is changed, are also feasible.

Figure 4:
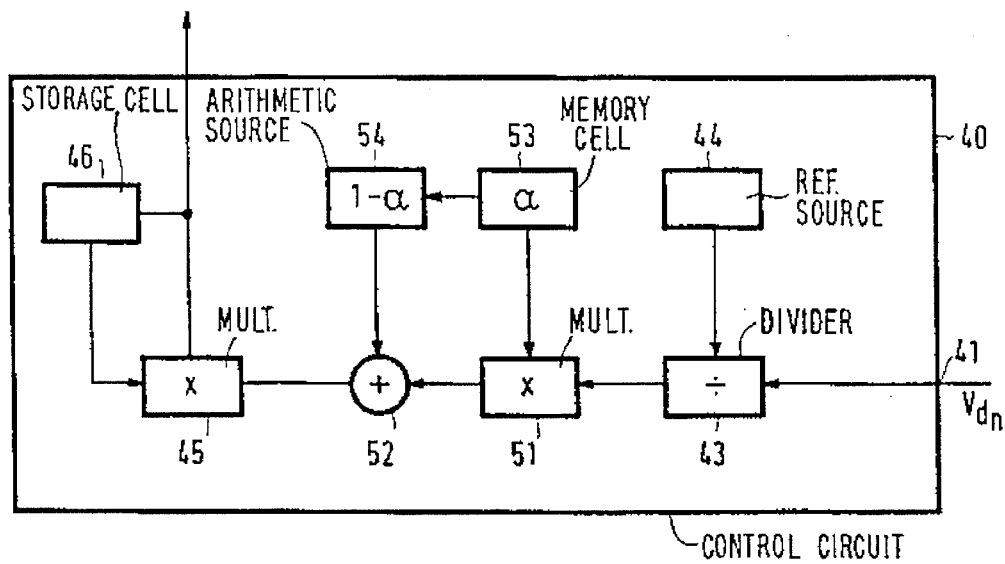
FIG. 4 shows diagrammatically an embodiment in which gradual adaptation takes place.

FIG. 4 shows an embodiment of the control circuit in which the gain $K_{n+1}$ for the interval n+ 1 is derived from the gain $K_n$ in the preceding interval n, the correction amounting to only a fraction of the ratio of the reference value Vref to the amplitude $Vd_n$ of the output signal of the video amplifier. Consequently, the adaptation of the gain of the video amplifier to a changed level of the video signal takes place gradually. In this embodiment an additional multiplier 51 and an adder circuit 52 are arranged between the divider 43 and the multiplier 45. In the multiplier 51 the ratio of Vref to $Vd_n$ is multiplied by a factor $\alpha(0<\alpha< 1)$ and in the adder circuit 52 the value $(1-\alpha)$ is added to the result. This addition is necessary so as to reach the adjusted level of the amplified signal again after some time. Therefore, the new value of the gain is:

$$K_{n+1} = K_n \left[ \left( \frac{Vref}{Vd_n} - 1 \right) \cdot \alpha + 1 \right].$$

The values of $\alpha$ and $1-\alpha$ originate, for example, from a memory cell 53 and an arithmetic circuit 54. A value of $\alpha<1$ has the effect of reduced loop gain in the control loop consisting of the video amplifier 20, the detector 30 and the control circuit 40. No delay occurs for $\alpha= 1$.

Figure 5:
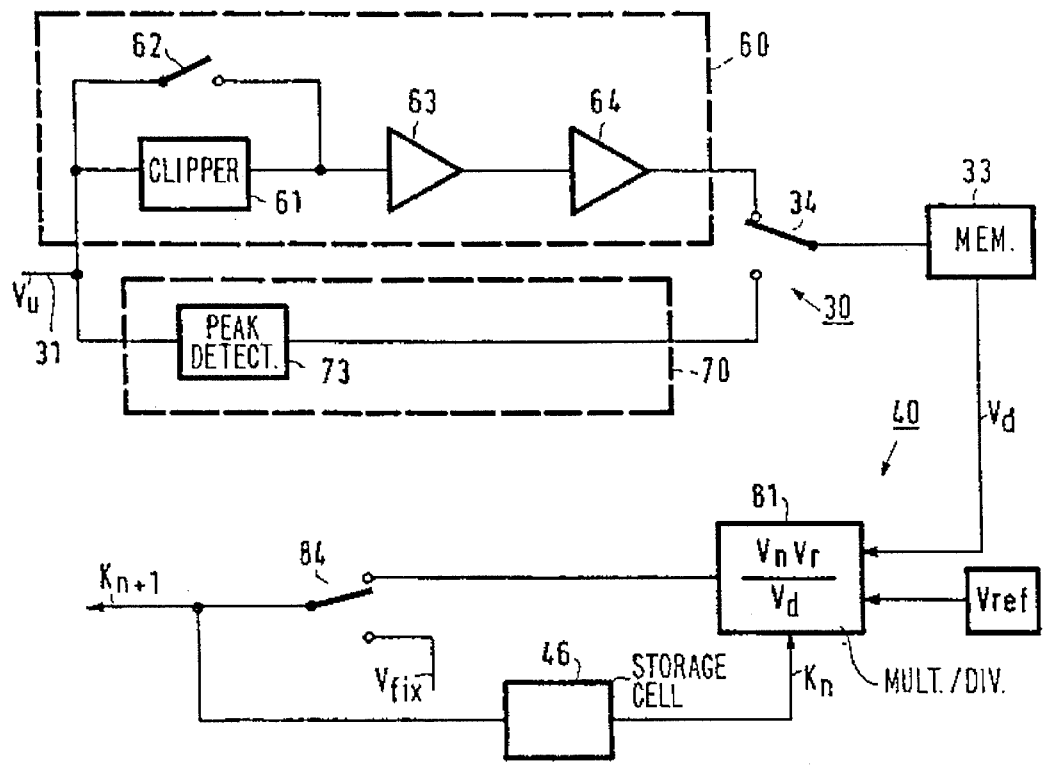
FIG. 5 is a detailed representation of an embodiment with supplementary features.

FIG. 5 shows an embodiment of the combination of the detector and the control circuit in which a number of supplementary choices are indicated. The detector 30 comprises two parallel chains 60 and 70 which are both coupled to the input 31 of the detector. Via a switch 34, both chains are connected to the output 32 of the detector. The setting of the switch 34 determines which of the two chains is active at a given instant.

The first chain 60 comprises a clipper 61 whereby extreme values, for example fully black and fully white, are ignored during detection of the signal level Vu. The clipper 61 can be deactivated by means of a switch 62. The clipper 61 is succeeded by an integrator 63 whereby the output signal of the clipper is integrated during an adjusted interval, for example coincident with scanning the image on an X-ray detector once. The integrated value is subsequently normalised in a multiplier 64 and subsequently becomes available on an input of the switch 34. The second chain 70 comprises a peak detector 73 which generates an output signal which is proportional to the maximum of the presented input signal during an adjusted interval. The intervals during which the integrator 63 and the peak detector 73 can be active are synchronized with the scanning of images in the X-ray detector by utilizing the vertical synchronization signals present in the video signal.

The control circuit 40 comprises a multiplier/divider 81 in which the product of the reference value Vref and the control signal stored in the sample-and-hold circuit 46 and representing the gain K is divided by the level Vd, determined in the detector 30, of the output signal of the video amplifier, determined in the detector 30. The control circuit 40 comprises a switch 84 whereby a value Vfix can be adjusted for the control signal, regardless of the intensity of the detected signal. As a result, the control circuit will have no effect on the gain in the video amplifier. The value Vfix can be permanently implemented in the system or be adjusted by the user, for example by means of a potentiometer. The various switches 62, 34 and 84 can also be controlled by the user.

I claim:

1. A video system with automatic gain control, comprising:

a variable gain signal amplifier having a signal input, a signal output and a gain control input;

a detector having an input of which is coupled to the signal output of the video amplifier in order to determine the level of the output signal at the signal output of the video amplifier indicated by the level of an output signal formed at an output of the detector; and a control circuit having an input of which is coupled to the output of the detector and having an output which is coupled to said gain control input in order to apply a control signal to the video amplifier, wherein the control circuit is configured for supplying a said gain control signal to said gain control input which is proportional to the ratio of a reference value to the level of the output signal of the detector.

2. A video system as claimed in claim 1, wherein the control circuit comprises a memory circuit for storing a previous value of the gain of the video amplifier and said control circuit is configured for supplying to said gain control input, at a later instant, a said gain control signal which is also proportional to the previous value stored in the memory circuit.

3. A video system as claimed in claim 2, wherein the memory circuit is a sample-and-hold circuit, an input of which is coupled to the output of the control circuit.

4. A video system as claimed in claim 1, wherein the control circuit is configured for supplying a said gain control signal to said gain control input for changing the gain of the video amplifier by a value which is a fraction of the ratio of the reference value to the level of the output signal of the detector.

5. An X-ray examination apparatus comprising:

an X-ray source for irradiating an examination space; an X-ray detector means for detecting radiation exiting said examination space and for producing a video signal at an output of the X-ray detector in response to said radiation;

a variable gain video amplifier having a signal input coupled to the output of the X-ray detector, a signal output, and a gain control input;

a video level detector means, an input of which is coupled to the signal output of the video amplifier, for detecting a level of an output signal of the video amplifier; and a control circuit, an input of which is coupled to an output of the video level detector and an output of which is coupled to said gain control input in order to apply a control signal thereto, said control circuit comprising means for generating a control signal proportional to the ratio of a reference value to the level detected by the video level detector means.

6. A video system as claimed in claim 2, wherein the control circuit is configured for supplying a said gain control signal to said gain control input for changing the gain of the video amplifier by a value which is a fraction of the ratio of the reference value to the level of the output signal of the detector.

7. A video system as claimed in claim 3, wherein the control circuit is configured for supplying a said gain control signal to said gain control input for changing the gain of the video amplifier by a value which is a fraction of the ratio of the reference value to the level of the output signal of the detector.

8. A video system with automatic gain control, comprising:

a variable gain signal amplifier having a signal input, a signal output and a gain control input;

a detector having an input of which is coupled to the signal output of the video amplifier in order to determine the level of the output signal at the signal output of the video amplifier indicated by the level of an output signal formed at an output of the detector; and a control circuit having an input of which is coupled to the output of the detector and having an output which is coupled to said gain control input in order to apply a control signal to the video amplifier and comprising a memory circuit for storing a previous value of the gain of the video amplifier, wherein the control circuit is configured for supplying a said gain control signal to said gain control input which is derived from the ratio of a reference value to the level of the output signal of the detector and which is proportional to the previous value stored in the memory circuit.

* * * * *